United States Patent

[11] 3,537,470

| [72] | Inventor | Gail Cornelius |
| | | Portland, Oregon |
| [21] | Appl. No. | 678,791 |
| [22] | Filed | Oct. 30, 1967 |
| [45] | Patented | Nov. 3, 1970 |
| [73] | Assignee | R. M. Wade & Co. |
| | | Portland, Oregon |
| | | a corporation of Oregon |

[54] ARTICULATED FEED PIPE SYSTEM FOR A SPRINKLER TYPE IRRIGATION LINE
1 Claim, 3 Drawing Figs.

[52] U.S. Cl. .................................................... 137/344, 239/213
[51] Int. Cl. ......................................................... A01m 7/00
[50] Field of Search .......................................... 137/343, 344; 239/212, 213, 286, 177, 287

[56] References Cited
UNITED STATES PATENTS
| 1,346,843 | 7/1920 | Ramen | 239/213 |
| 1,601,199 | 9/1926 | Clapper | 239/213 |
| 3,057,559 | 10/1962 | Ingram et al. | 239/213 |
| 3,195,563 | 7/1965 | Race | 137/344X |
| 3,381,893 | 5/1968 | Smith et al. | 137/344X |
| 1,184,274 | 5/1916 | Thompson | 239/287X |
| 2,174,600 | 10/1939 | Schutmaat | 239/212X |
| 3,281,080 | 10/1966 | Hogg | 137/344X |

FOREIGN PATENTS
| 255,959 | 1/1913 | Germany | 239/286 |
| 296,184 | 1/1917 | Germany | 239/212 |
| 324,534 | 9/1920 | Germany | 239/177 |

Primary Examiner—Dorsey Newton
Attorney—Fryer, Tjensvold, Feix, Phillips and Lempio ABSTRACT: Connecting means between a movable pipe line which distributes water over soil to be irrigated and an outlet of a stationary supply line constructed to enable movement of the distributing line over a very large area without the necessity of moving the connecting means to a different outlet on the supply line.

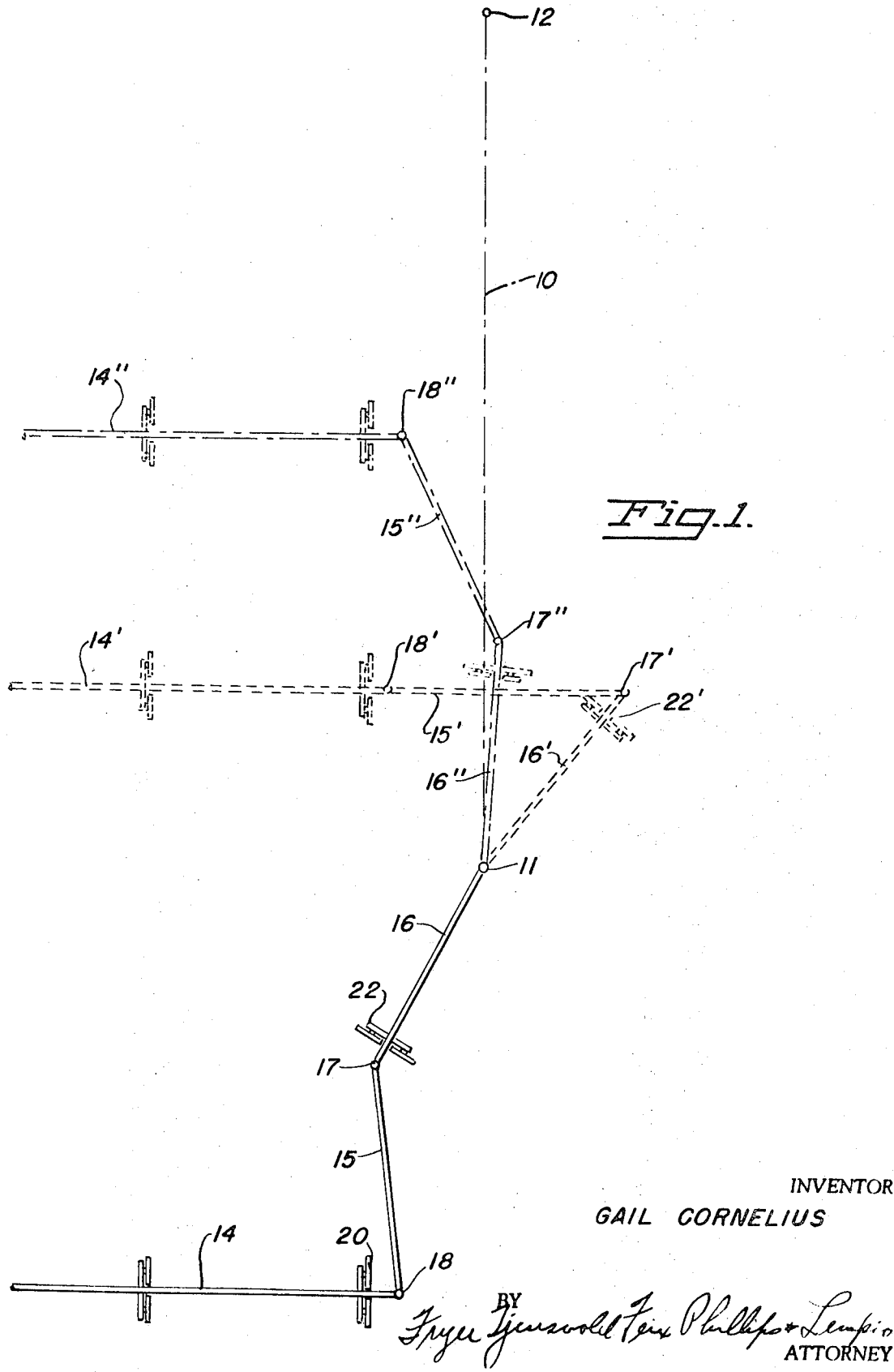

Patented Nov. 3, 1970 3,537,470
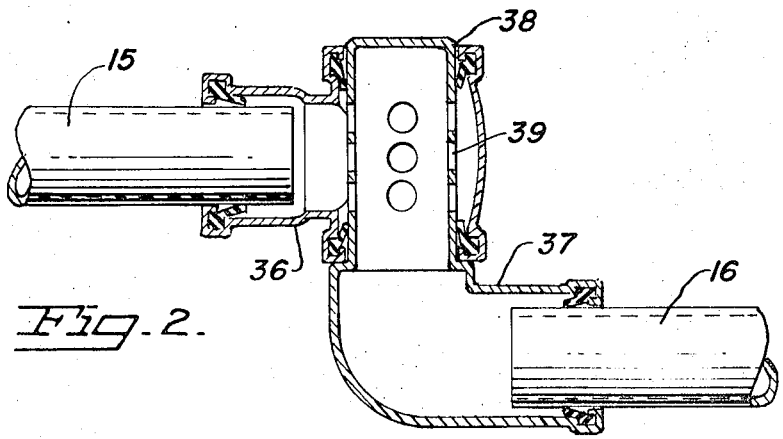
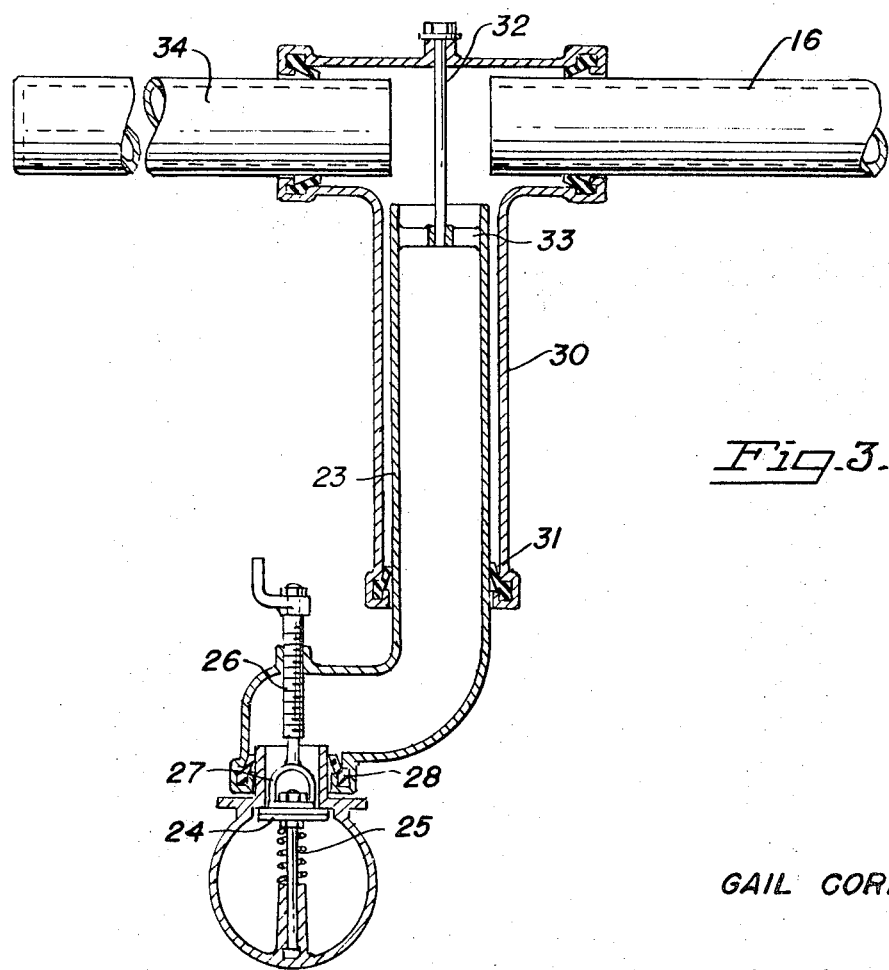
INVENTOR
GAIL CORNELIUS 3,537,470

ARTICULATED FEED PIPE SYSTEM FOR A SPRINKLER TYPE IRRIGATION LINE

Sprinkler type irrigation equipment assumes many forms and the most prevalent forms comprise a long pipeline movable on wheels or skids and having spaced outlets with nozzles for distributing water onto the soil. A long narrow strip is irrigated by this means and then the pipeline is moved to a new and adjacent location. This is repeated until an entire selected field or area is adequately irrigated.

Such pipelines were originally disjointed and moved by hand between spaced valved outlets in a main or supply line disposed along one margin of the field or centrally of the field. At present they are often moved by power means such as a tractor which pulls them lengthwise as taught in the U.S. Pat. No. 2,769,664 to Gail Cornelius. They are also more frequently moved by a small engine on a power drive means such as disclosed in the Cornelius U.S. Pat. No. 2,582,416. Various other sources of power are used for moving the lines such as electrical and hydraulic. A disadvantage common to all devices like those described above is that an attendant is required to visit the line several times a day to move it from one position to the next. Labor costs are high and considerable time is required to drain the line, uncouple it, move it and couple it in its new position. Attempts have been made to move such a line continuously and at a very slow rate of speed so that it need be attended only once where it is started and again at the end of its travel. This presents difficulties not the least of which is that of supplying water to a moving line continuously as it travels a distance which is often one-half mile or more.

It is the object of the present invention to provide means for supplying water from a source to a moving line by means which may remain connected with the source and line over a long range of line travel, thus relieving the cost and labor of frequent visits by an attendant.

Further and more specific objects and advantages of the invention and a preferred manner of carrying it into practice are set forth in the following specification wherein reference is made to the accompanying drawings.

In the drawings:

FIG. 1 is a schematic plan view of a portion of a system embodying the present invention;

FIG. 2 is a fragmentary sectional view of a swivel joint used in the articulated feed pipe system of the present invention; and FIG. 3 is a vertical sectional view through a stand pipe and valve employed for directing water from a main or supply line through the articulated feed pipe to the irrigation line.

Referring first to FIG. 1 of the drawings, the position of a main or supply line of a system embodying the present invention is shown in broken lines at 10. This line may be underground or exposed and is generally disposed along one edge or the center line of a large field. Water from a suitable source is pumped through this supply line and valved outlets are provided at spaced intervals as indicated at 11 and 12. A sprinkler line, a short part of which is shown in full lines at 14 in FIG. 1, is connected to the valved outlet 11 by a feed pipe system comprising two pipes 15 and 16 pivotally connected together at 17, pivotally connected to the outlet 11 and pivotally connected as shown at 18 to the sprinkler line 14. The sprinkler line 14 is provided with spaced sprinkler fittings (not shown) which might spray water for example over a radius of 50 feet and the sprinklers are arranged to spray water in overlapping circles so that their effective radius for coverage of the ground with ample moisture is approximately 30 feet. Thus, if the line 14 were to be directly connected, as was previously the case, first with the outlet 11 and then with the outlet 12, these outlets would have to be about 60 feet apart. As a consequence each time that a 60 foot area was adequately moistened, it would be necessary for an attendant to visit the site, drain the water from the line and move it to the next outlet 60 feet away.

With the present invention, the outlets 11 and 12 may be spaced more than 200 feet apart thus requiring an attendant at infrequent intervals. This is accomplished by moving the pipe constantly at a slow rate of speed during the sprinkling operation and providing a connection with the supply line which provides water for sprinkling during this movement. The pipe 14 is supported on wheels or carriages such as schematically illustrated at 20 so that it may roll in a direction normal to its axis. Any suitable source of power may be employed for rolling the pipe at a slow rate of speed calculated to deposit the desired amount of water on the earth during its uninterrupted travel.

To supply water to the pipe 14, the articulated links 15 and 16 form a connection with the supply line as hereinbefore mentioned and are supported for movement over the surface of the ground by carriage, generally indicated at 22, and which for present purposes may be considered similar to the carriages 20. The pipe 14 in its full line position is illustrated as in a starting position showing the valved outlet 11 of the line 10 to be the first of many in the line. The articulated links 15 and 16 are not arranged to provide the greatest possible length but are angularly arranged with respect to each other so that upon forward movement of the pipe 14 under influence of its driving means, the links 15 and 16 will tend to collapse into their dotted positions 15' and 16' shown in FIG. 1. After the carriage 22 has crossed the line 10 it assumes the position 22'. Upon continuing forward movement of the sprinkler line 14, it passes this dotted line position 14' and goes on to the position shown at 14" with the links 15 and 16 now occupying the position indicated in broken lines at 15" and 16". The links 15 and 16 are, in one application, 40 foot lengths of pipe and since it is not practical to start them from an aligned position, they are started from an angularly disposed position such as shown in FIG. 1 and the total distance from the position of the sprinkler pipe shown at 14 to that shown at 14" is approximately 80 feet. Since the sprinklers on the line have an effective radius of 30 feet, the total area covered during movement of the pipe from the extreme position shown is approximately 110 feet.

When the sprinkler line has attained the position shown at 14", the water must be shut off, the sprinkler line drained the feed pipe sections 15 and 16 repositioned between the point 18" and the outlet 12. To accomplish this, a valve is closed at the point 11, the construction of this valve being later described in detail, and after the lines have been drained by conventional means, the pipes 15 and 16 are separated at the pivotal connection 17, as will also be more fully described, and the pipe 15 is swung from the position 15" to a position corresponding to the starting position shown at 15. The pipe is then separated from its connection at 11 and, with the wheels of the carriage 22 adjusted to a position at right angles to that shown, the pipe may easily be moved from the position 16" to a new position corresponding to that shown at 16. Wheels adjustable in this manner are well known in the art and shown for example in the U.S. Pat. to Cornelius No. 2,860,007. Since the sprinkler pipe 14 may be a quarter of a mile or more in length and since it moves in excess of 100 feet while connected to any one outlet in the supply line, a great deal of area may be adequately irrigated and an attendant may be required to visit the line not more than once or twice a day depending upon soil conditions and other variables.

While it is known to employ articulated lines to provide flexibility in fluid conduits, the use of such a line comprising only two parts is highly desirable and is made possible by the arrangements illustrated in FIGS. 2 and 3. In FIG. 3, a stand pipe or riser 23 is shown as extending upwardly from a T fitting, which may be the valved outlet 11 of FIG. 1, included in the supply line 10. A valve 24 is urged by a spring 25 to close the opening of the T fitting and the valve may be urged to an open position by rotation of a threaded stem 26 which is detachably connected to the valve by a yoke 27. The entire stand pipe is connected by a sliding fit with the T fitting including a gasket 28. Consequently merely lifting the stand pipe permits its separation and removal to a new location. Embracing the stand pipe is a second T fitting with a long part 30 slidable over the stand pipe and sealed by a gasket 31. A threaded bolt 32 engages the threaded opening in a spider 33 to position the T fitting with respect to the stand pipe. Extending horizontally from one part of the T is the pipe 16. The opposite part of the T may be sealed or may have a blind pipe 34 extending therefrom which, when filled with water, will tend to counterbalance the pipe 16 and reduce the pressure of the carriage 22 on the ground. A pivotal connection between the pipes 15 and 16 is shown in detail in FIG. 2 and a similar connection may also be used at the point 18 where the pipe 15 connects with the sprinkler line. This connection includes a T-shaped fitting 36 on the end of the pipe 15 and an L-shaped fitting 37 on the end of the pipe 16. The L-shaped fitting has a blind upright extension 38 with several large perforations 39 formed therein, all connections between the fittings and pipes being sealed by suitable gaskets of a conventional type. By virtue of the pivotal connection shown in FIG. 2, water under pressure in line 15 enters line 16 without exerting an endwise thrust in a vertical direction within the T-shaped fitting and therefore does not tend to cause separation of the line. However there is very little resistance to separation of the empty line when an attendant raises the line 15 to swing it to its new position.

The articulated feed pipe system of the present invention enables uninterrupted flow to the sprinkler line over an extended period with a minimum of friction and rearrangement of the articulated connection upon the completion of each extended period of operation is simple and easily accomplished.

I claim:

1. Feed pipe means for use between spaced outlets in a water supply line and one end of a movable sprinkler line, comprising lengths of rigid pipe forming communication between said lines, pivotal water tight connections between said lengths of pipe and said lines and between each other, said pivotal connection between one of said lengths of pipe and one of said outlets including a vertical stand pipe at said one of said outlets, a T-shaped fitting with its central outlet fitting over the vertical stand pipe to provide the pivot, said one length of pipe fitted in one end outlet of the tee, and another length of pipe fitted in the other end outlet and closed at its outer end to retain water as a counterbalance.